United States Patent [19]

Gloe et al.

[11] Patent Number: 5,129,317
[45] Date of Patent: * Jul. 14, 1992

[54] PRESS DRIVEN BY AN ELECTRIC MOTOR THROUGH REDUCTION GEARING

[75] Inventors: Karl-Heinz Gloe, Reichelsheim; Helmut Kreuzer, Munster; Harald Biehl, Bensheim, all of Fed. Rep. of Germany

[73] Assignee: AMP Incorporated, Harrisburg, Pa.

[*] Notice: The portion of the term of this patent subsequent to May 26, 2009 has been disclaimed.

[21] Appl. No.: 544,459

[22] Filed: Jun. 27, 1990

[51] Int. Cl.$^5$ .................... B30B 15/14; B30B 1/26
[52] U.S. Cl. ............................ 100/48; 72/26; 100/214; 100/231; 100/292; 318/369
[58] Field of Search ........... 100/214, 280, 282, 291, 100/292, 43, 48, 49, 53, 99, 215, 231; 72/452, 21, 24-26, 443; 83/628; 364/476; 318/369, 626; 29/566.2, 714, 715, 748, 753, 754, 863; 226/8, 24, 32

[56] References Cited

U.S. PATENT DOCUMENTS

| | | | |
|---|---|---|---|
| 2,213,450 | 9/1940 | Munschauer et al. | 100/231 |
| 2,213,451 | 9/1940 | Munschauer et al. | 100/231 |
| 2,432,886 | 12/1947 | Hatch et al. | 100/231 X |
| 3,064,559 | 11/1962 | Treer | 100/292 |
| 3,184,950 | 5/1965 | Sitz . | |
| 3,400,625 | 9/1968 | Wrona | 100/292 X |
| 3,795,962 | 3/1974 | Baldyga | 29/753 X |
| 3,906,315 | 9/1975 | Gotisar | 318/369 X |
| 4,024,807 | 5/1977 | Karsen | 100/292 X |
| 4,062,213 | 12/1977 | Schneider et al. | 100/43 X |
| 4,246,523 | 1/1981 | Nagai | 100/48 X |
| 4,438,377 | 3/1984 | Sakai et al. | 318/369 X |
| 4,691,653 | 9/1987 | Neki et al. | 318/369 X |
| 4,761,988 | 8/1988 | Kato | 100/282 X |
| 4,907,343 | 3/1990 | Dolan et al. | 29/714 X |
| 5,033,187 | 7/1991 | Gloe et al. | 29/753 |

FOREIGN PATENT DOCUMENTS

| | | | |
|---|---|---|---|
| 245939 | 3/1966 | Austria . | |
| 253360 | 4/1967 | Austria . | |
| 132707 | 10/1978 | German Democratic Rep. . | |
| 55-48500 | 4/1980 | Japan | 100/292 |
| 56-76812 | 6/1981 | Japan | 318/626 |
| 59-189100 | 10/1984 | Japan | 100/43 |

Primary Examiner—Harvey C. Hornsby
Assistant Examiner—Stephen F. Gerrity
Attorney, Agent, or Firm—Eric J. Groen; Bruce J. Wolstoncroft

[57] ABSTRACT

The press (2) comprises a housing (4) in the forward part of which a slide ram (22) is mounted on bearings (62). The ram (22) is driven by an electric motor (26) by way of reduction gear box (24), having an output shaft (79) to which is eccentrically mounted a stub shaft (78) surrounded by a roller bearing ring (80) in a bearing block roller (82). As the output shaft (79) is rotated by the motor (26), the roller (82) rolls back and forth along a guideway (74) formed in the rear face of the ram (22), to take up the eccentricity of the shaft (78). The ram (22) is centrally mounted in its bearings (62) to avoid its canting as it is driven.

12 Claims, 9 Drawing Sheets

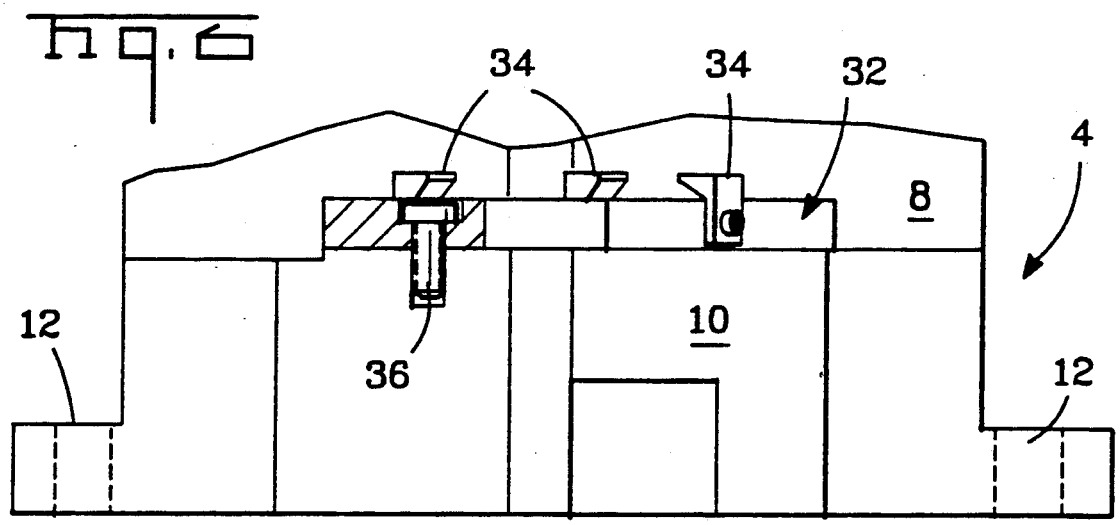
fig.6
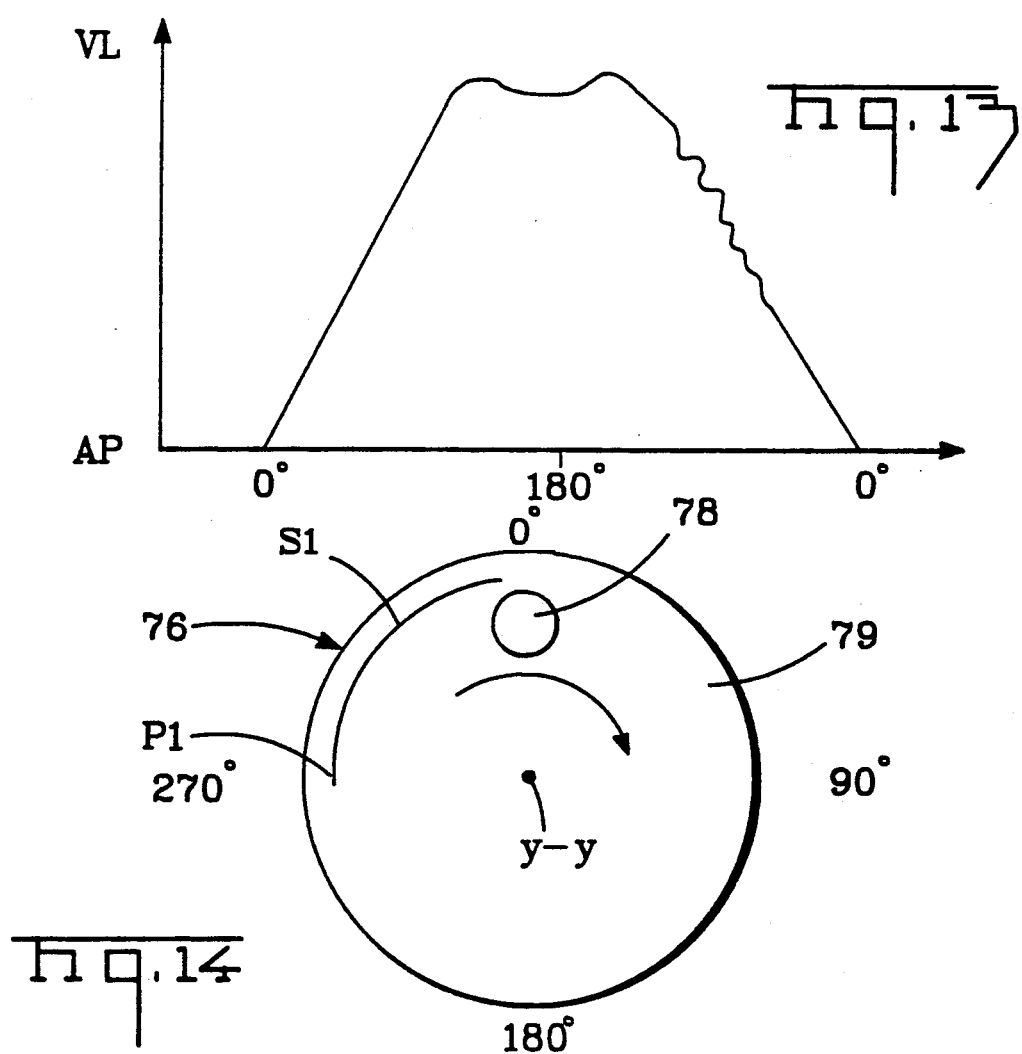
fig.13
fig.14

PRESS DRIVEN BY AN ELECTRIC MOTOR THROUGH REDUCTION GEARING

BACKGROUND OF THE INVENTION

1. Field of the Invention

This invention relates to a press driven by an electric motor through reduction gearing and particularly concerns a press for operating an electrical terminal applicator.

2. Description of Related Prior Art

There is described in each U.S. Pat. No. 3,400,625 and U.S. Pat. No. 4,024,807, a press having a press ram which is driven in sliding reciprocating movement by an electric motor through a drive shaft rotatably supported in a press frame and having a pair of annular members thereon which are eccentric with respect to the axis of rotation of the drive shaft, each annular member being mounted for rotation in bearings in a respective bearing block which is received in a transverse guideway in a respective cross head of the ram. As the drive shaft is rotated by means of the motor, each bearing block moves along the guideway and thereby takes up the eccentricity of the annular member. U.S. Pat. No. 3,064,559 and U.S. Pat. No. 4,761,988 disclose analogous eccentric means for driving a press ram, in which an annular eccentric member of the drive shaft of the press is mounted in a roller bearing ring. Further analogous eccentric means for driving a press ram are disclosed in JP-A-55-48500, AT-A-253360 and AT-A-245939, the ram being mounted at the forward end of the press frame (in the case of the two latter of these references) and being driven by a single eccentric member and bearing block arrangement. DD-A-132707 discloses a press having a ram which is vertically slidable on inner and outer bearing tracks, the outer tracks being adjustable with respect to the inner tracks for adjusting the desired bearing resistance. According to U.S. Pat. No. 4,024,807, each of said cross heads has a central axis which is perpendicular to the axis of rotation of the drive shaft and is parallel to the guideway, each cross head being mounted to slide into bearings which are bisected by the central axis of the cross head.

According to U.S. Pat. Nos. 4,024,807, 3,400,625, 3,064,559 the electric motor drives the drive shaft connected to the eccentric means, by way of a belt and pully speed reduction means. In each case the rotational axis of the motor which is mounted outside of the press, is offset from the drive shaft and the speed reduction means is located at an end of the press housing remote from the ram.

De-A-3320023 discloses a press comprising a direct current electric motor connected to a slide ram of the press by way of reduction gearing and an eccentric drive shaft, and a control circuit arrangement comprising an incremental encoder for producing a first output representing the angular position of the drive shaft, and thus the linear position of the slide ram and means for controlling the speed of the drive motor to stop the slide ram at least proximate to a home position thereof at the end of each cycle of operation of the slide ram. This control circuit arrangement does not continuously monitor the speed of the motor so that the ram is not stopped proximate to its home position until several cycles of the press have been carried out.

SUMMARY OF THE INVENTION

Invention is intended to provide a press which is of simple and compact construction and which is particularly suitable for operating an applicator for applying electrical terminals to electrical leads.

According to one aspect of the invention, the press comprises a press ram mounted in a press frame. The press frame is provided with an elongate ram drive housing having a forward end, a rear end and opposed side walls extending therebetween longitudinally of the housing. The housing is supported on a pedestal having a base projecting forwardly from the pedestal and into alignment with the press ram. Guide tracks on the forward end of the housing receive and slideably guide the press ram for reciprocating motion along a rectilinear path of movement towards and away from the base. Reduction gearing means mounted between the side walls of the housing, rearwardly of the ram have an output shaft, the reduction gearing means being drivable to cause the output shaft to rotate about its own axis. An eccentric assembly has a drive shaft projecting from the output shaft of the reduction gearing means eccentrically with respect to the axis of rotation of the output shaft of the reduction gearing means. The drive shaft is connected to the ram for driving it towards and away from the base during each revolution of the output shaft and for concurrent movement of the drive shaft transversely of the path of movement of the ram. The eccentricity of the drive shaft of the eccentric assembly is thereby taken up, whereby its rotary movement is converted into said rectilinear reciprocating movement of the ram. The ram is driven by an electric motor having an output shaft which is drivably connected to the reduction gearing means to drive it. The electric motor is mounted between the side walls of the housing rearwardly of, and adjacent to, the reduction means and in alignment therewith and the output shaft of the motor and that of the reduction gearing means have a common axis of rotation extending rectilinearly midway between the side walls of the housing.

Thus the electric motor and the reduction gearing means, which may be in the form of rectangular gear box are compactly mounted in the housing behind the eccentric assembly and the ram with the housing supported by the pedestal and the ram overhanging the base, which may be arranged to have an electrical terminal applicator secured thereto for operation by means of the ram.

According to another aspect of the invention, the press is provided with means for ensuring that the press ram is stopped after each revolution of the drive shaft of the eccentric assembly, at least approximately in a top dead center, or fully raised, position remote from the base, thereby to ensure that the parts of the electrical terminal applicator are correctly positioned at the commencement of each cycle of the operation of the press ram. To this end, the electric motor may be a synchronous direct current electric motor having encoding means connected to the output shaft of the motor for producing a first output representing the angular position of the drive shaft of the eccentric assembly, the motor also being provided with measuring means, for example HALL effect sensors, for producing a second output representing the speed of the output shaft of the motor, electronic circuit means being connected to the encoding means, the measuring means, and to the motor, for controlling the speed of the motor according to a desired motor speed program stored in the electronic circuit means.

BRIEF DESCRIPTION OF THE DRAWINGS

FIG. 6 is an enlarged elevational view, shown partly in section, of the lower part of the press shown in FIG. 1 and having fixed thereto a mounting plate for an electrical terminal applicator;

FIG. 7 is an enlarged fragmentary side view of the upper part press;

FIG. 13 is a graph illustrating the operation of the control circuit arrangement; and FIG. 14 is a diagram of an eccentric assembly of the press, associated with the graph of FIG. 13.

The mechanical construction of the press will now be described with particular reference to FIGS. 1 to 10.

DESCRIPTION OF THE PREFERRED EMBODIMENT

Figure 1:
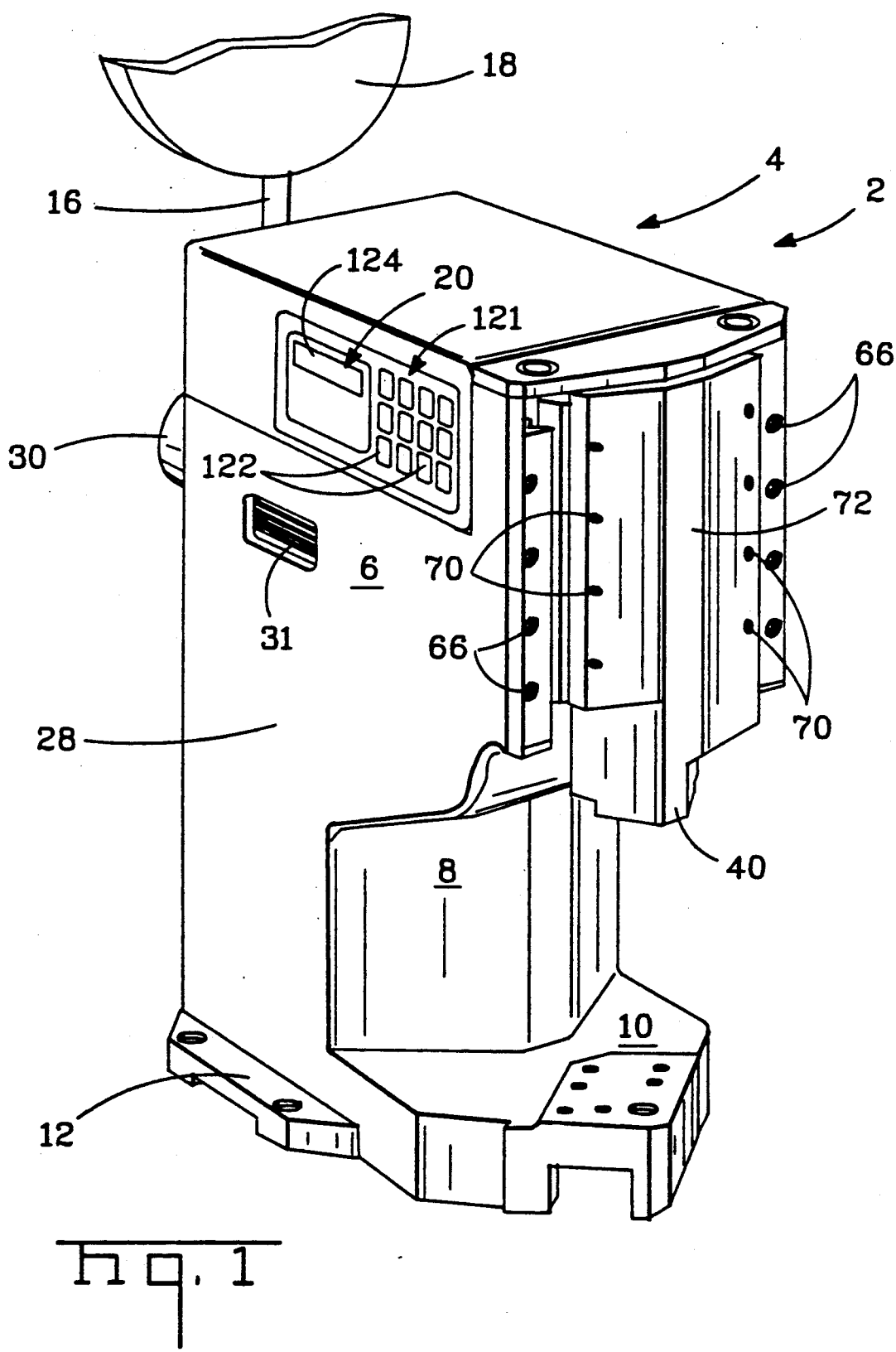
FIG. 1 is an isometric view of an electronically controlled crimping press having a slide ram, which is shown in a fully raised, home position.
Figure 2:
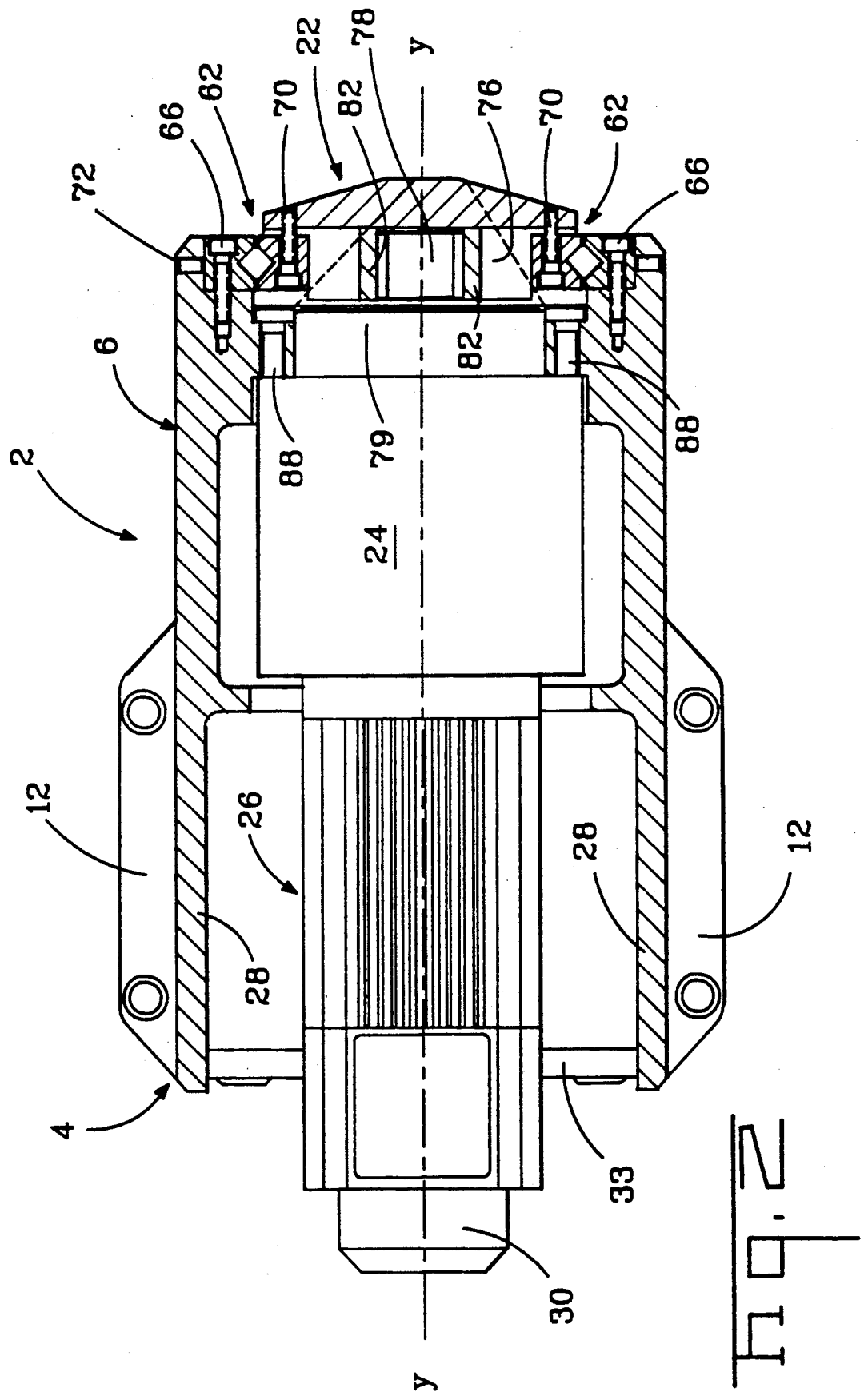
FIG. 2 is an enlarged top plan view of the press shown mainly in section.
Figure 11:
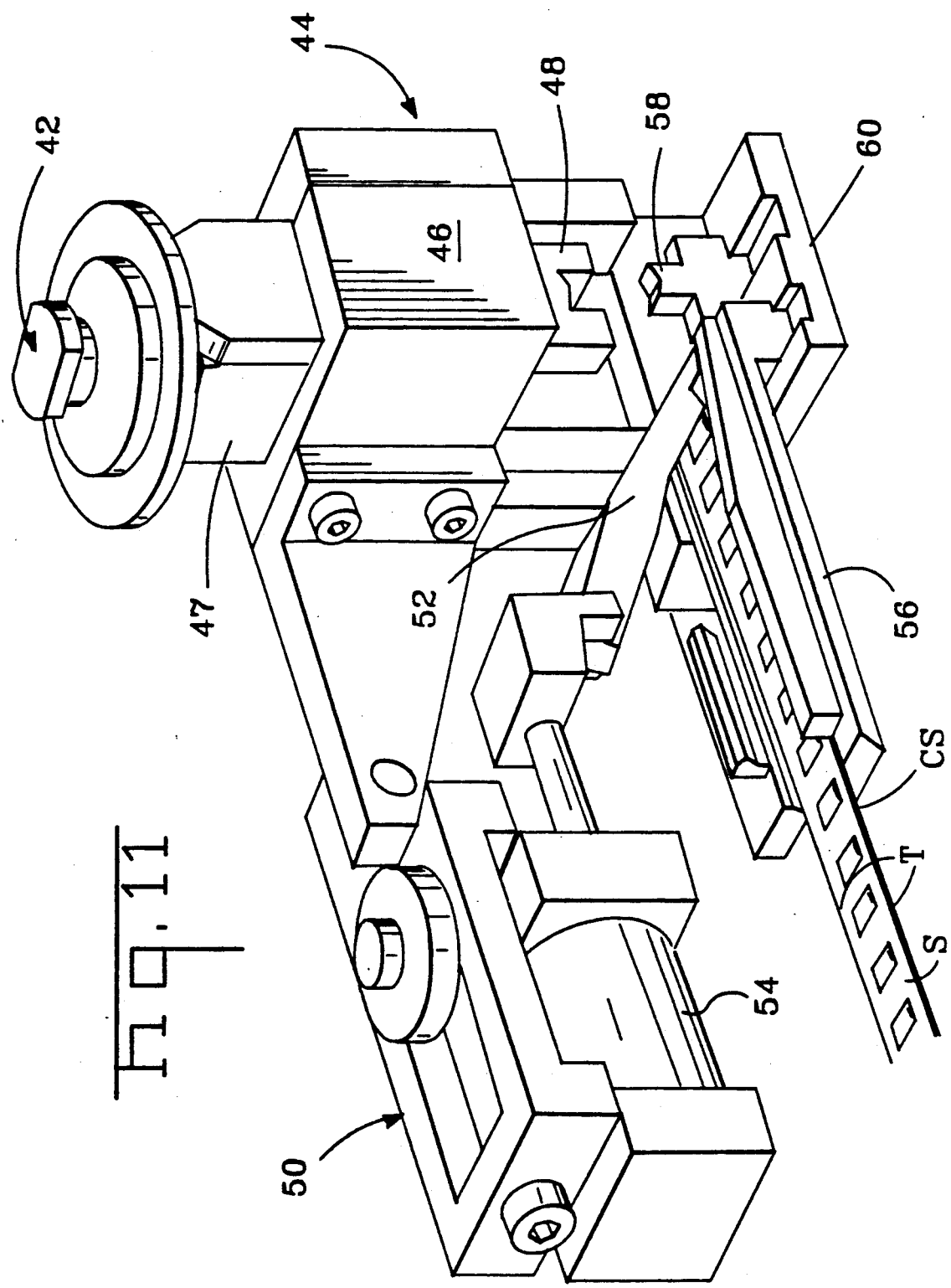
FIG. 11 is an isometric view of one example of an electrical terminal applicator for the press.
Figure 12:
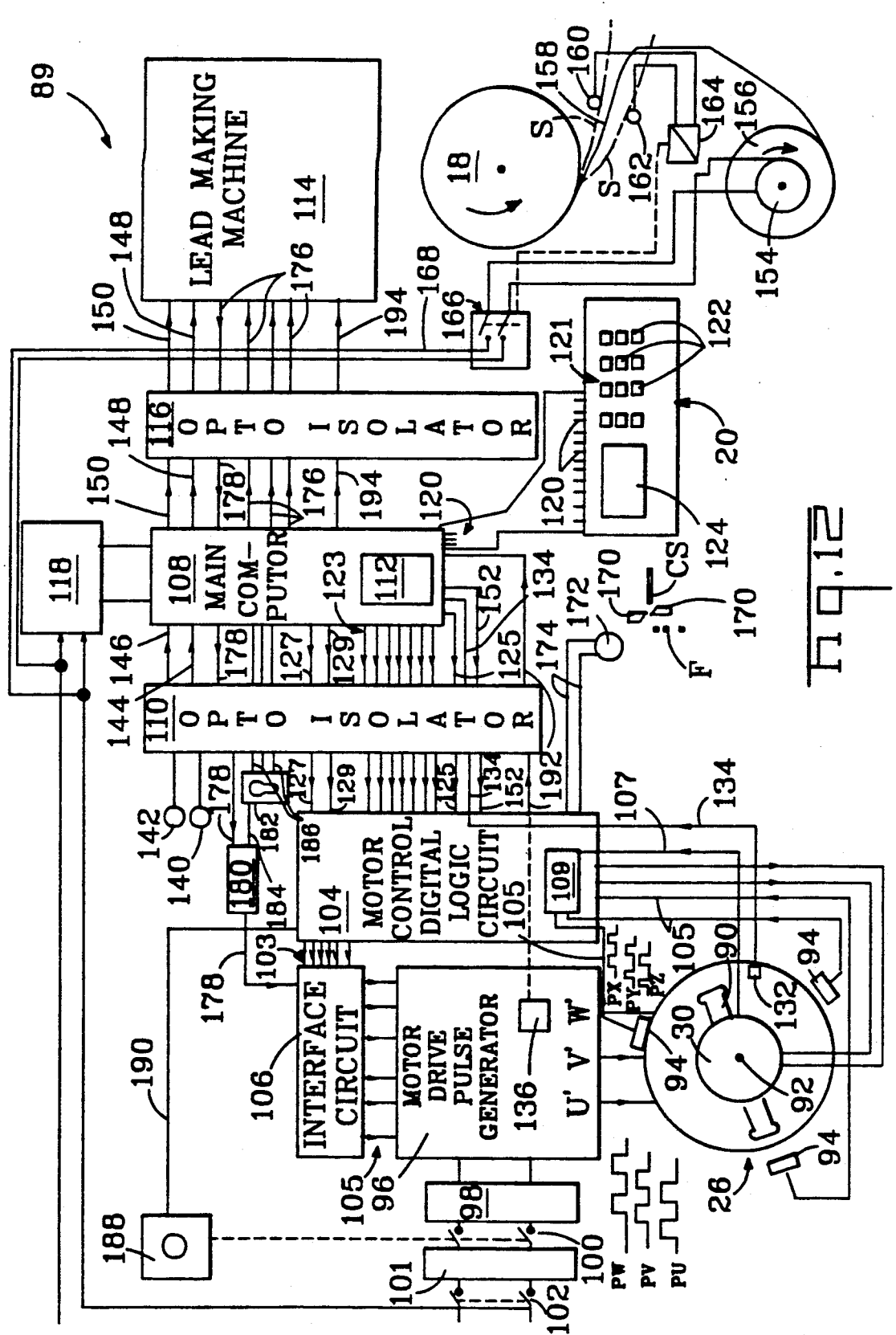
FIG. 12 is a block schematic diagram illustrating an electronic control circuit arrangement for the press and for a lead making machine.

An electronically controlled crimping press 2, comprises, a cast metal frame 4 having a generally rectangular ram drive housing 6, a pedestal 8 formed integrally therewith, and an applicator mounting base 10 formed integrally with the pedestal 8, mounting lugs 12 projecting from opposite sides of the latter. There projects from the rear of the housing 4, as shown in FIG. 7, a lug 14 supporting a vertical shaft 16 carrying a rotatable storage reel 18, part of which is shown in FIG. 1, and about which is wound strip S (FIG. 11) of electrical terminals T. Secured to one side of the housing 6, is a control panel 20, for use in operating an electronic control circuit, which is described below and which is shown in FIG. 12. Arranged for vertical, reciprocating, sliding movement, in the forward part of the housing 6, is a slide ram 22, which is connected, as best seen in FIG. 2, by way of a reduction gear box 24, to a three-phase, brushless, maintenance free, DC synchronous electric motor 26. The motor 26 is mounted in the housing 6 with considerable clearance from its side walls 28, in which are provided louvers 31 for augmented ventilation of the motor 26. There is connected to the output shaft of the motor 26, at the opposite end of the shaft to the gear box 24, an incremental encoder 30 fixed to the motor 26. The gear box 24 is secured to the side walls 28 by means of screws 88.

As shown in FIG. 6, an applicator mounting plate 32 provided with applicator mounting lugs 34 is secured to the base 10 by means of screws 36. The slide ram 22 is provided at its lower end with an adaptor 40 for releasably securing the ram 22, as shown in FIG. 7, to a complementary adaptor 42 of an electrical terminal applicator 44, an example of which is shown in FIG. 11. The applicator shown in FIG. 11 is end feed applicator, comprising a ram housing 46 containing an applicator ram 47 terminating at its upper end in the adaptor 42 and at its lower end, in terminal crimping dies 48. The applicator 44 has a terminal strip feeding device 50 for the strip S, comprising a feed finger 52 arranged to be driven in reciprocating motion by means of a piston and cylinder unit 54 to drive the strip S of electrical terminals along a feed track 56 towards a terminal crimping anvil 58 on an applicator base 60 adapted to be secured to the plate 32 by means of the lugs 34. Such an applicator is described, for example, in U.S. Pat. No. 3,184,950, which is incorporated herein by reference.

Figure 3:
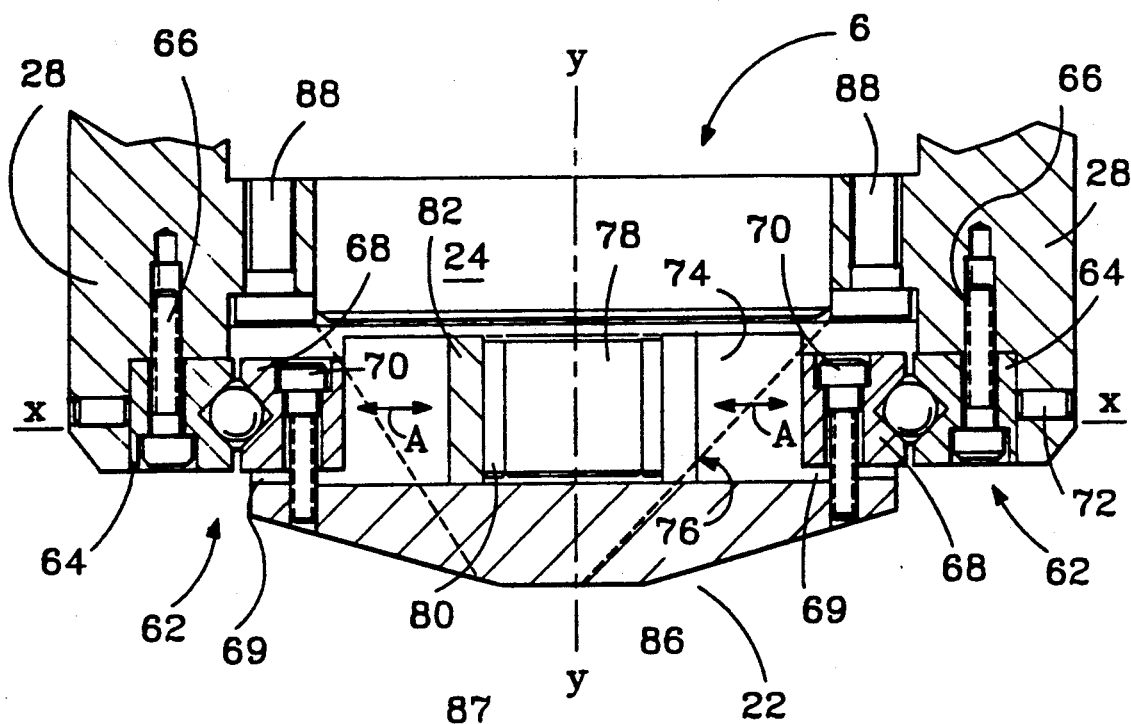
FIG. 3 is an enlarged fragmentary view illustrating details of FIG. 2.
Figure 8:
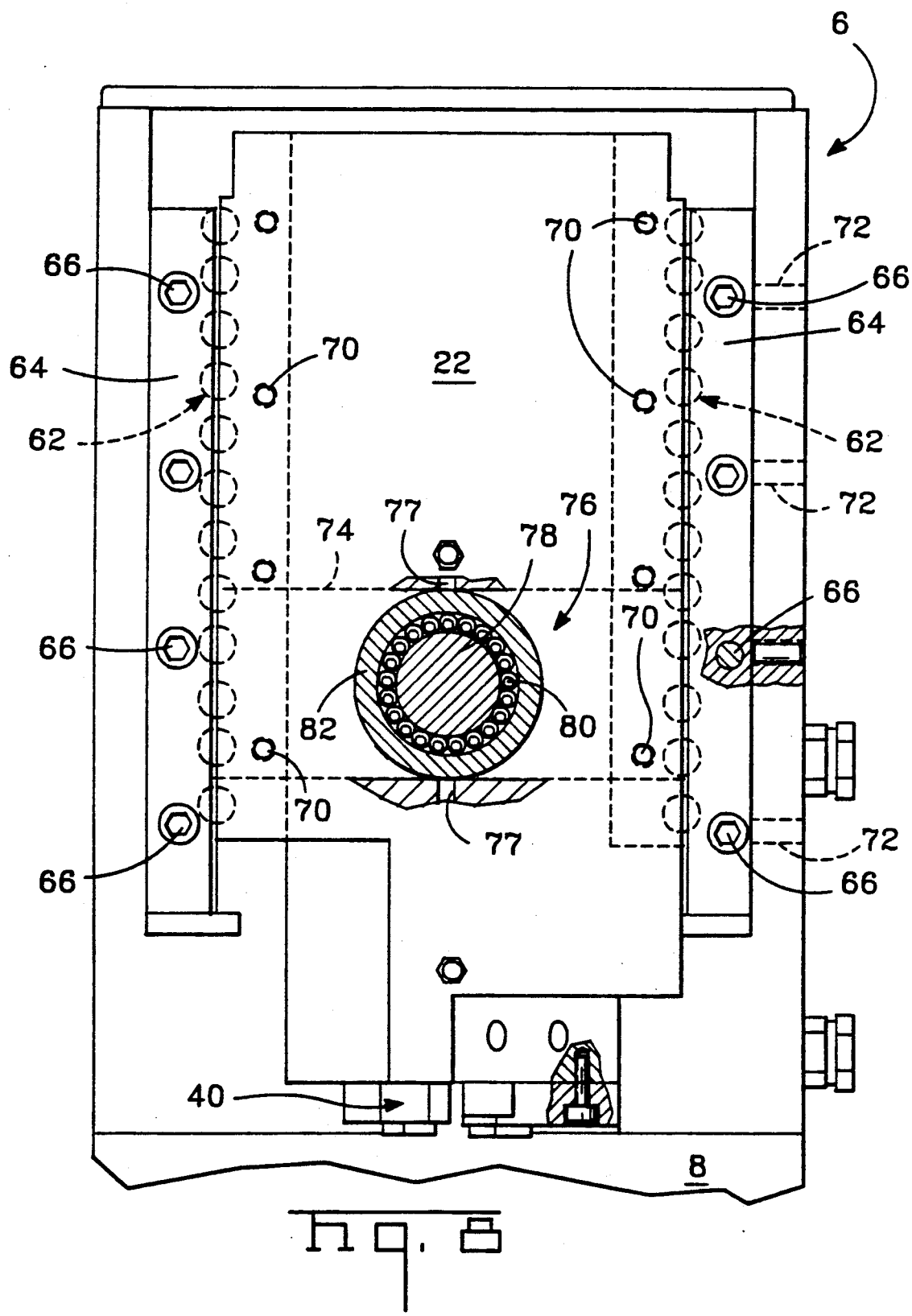
FIG. 8 is an enlarged front view, shown partly in section, of the upper part of the press.
Figure 9:
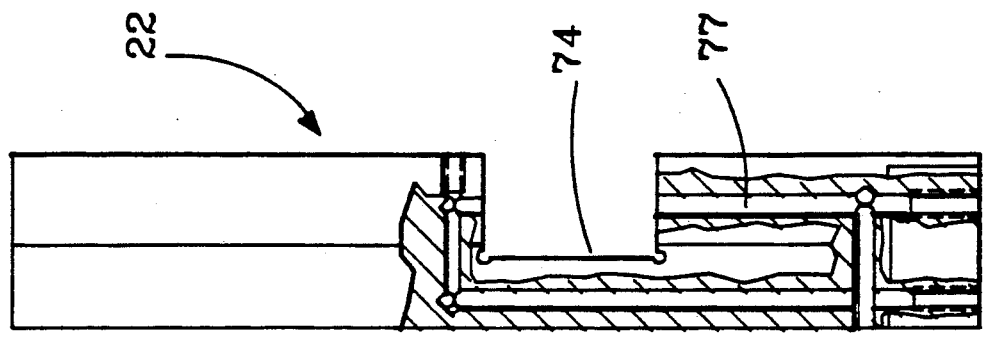
FIG. 9 is an enlarged side view, shown partly in section, of the slide ram.
Figure 10:
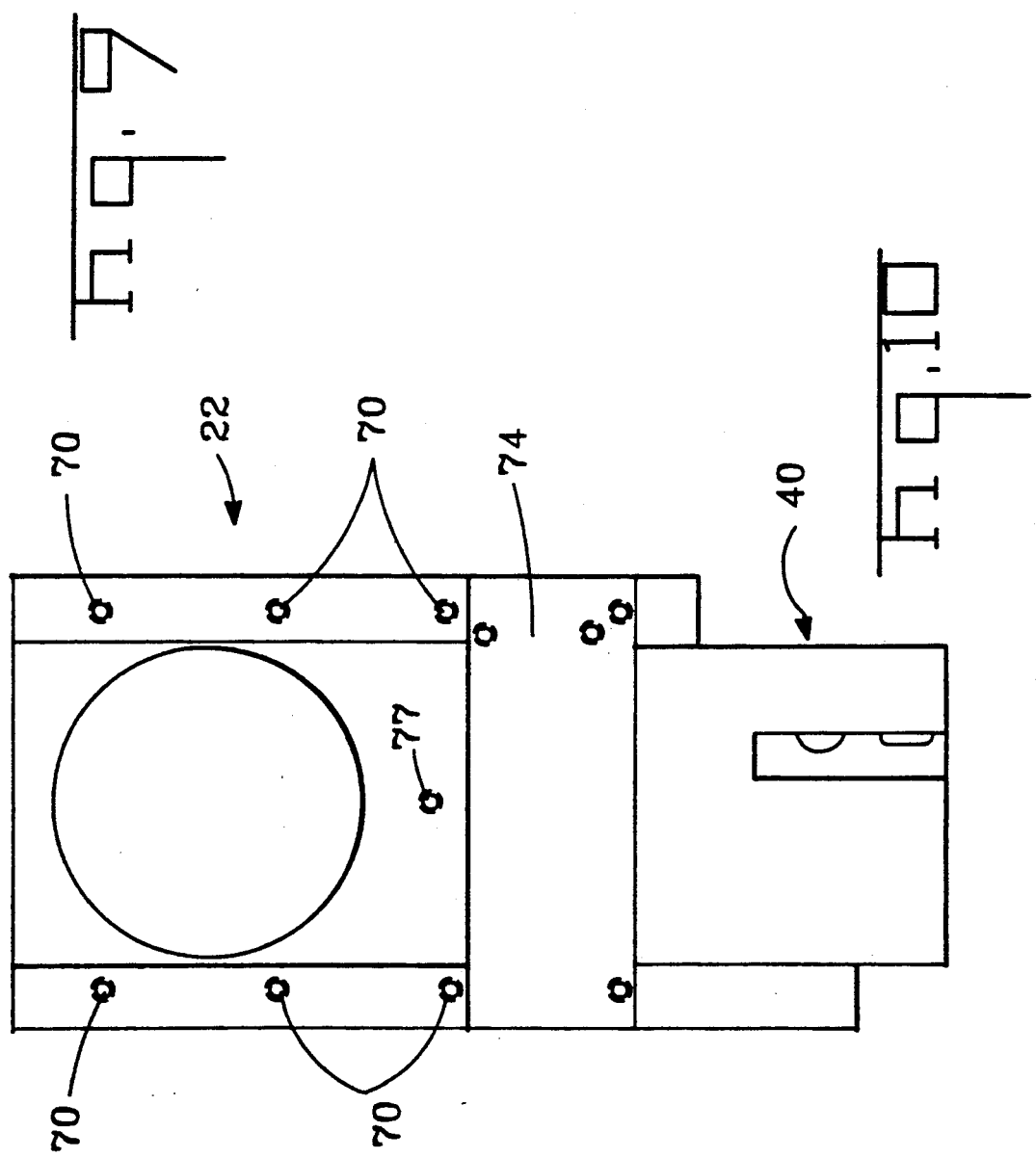
FIG. 10 is an enlarged front view of the slide ram.

The ram 22 is mounted to the side walls 28 of the housing 6 by way of roller or ball bearings 62 comprising outer tracks 64 secured to the side walls 28 by means of screws 66, as best seen in FIG. 3, and inner tracks 68 secured to lugs 69 extending along vertical margins of the ram 22 by means of screws 70. The track 64 on one side wall 68 is laterally adjustable by means of grub screws 72, as will best be appreciated from FIG. 8. As best seen in FIG. 3, the ram 22 is mounted in the bearings 62 bisected by its transverse, or horizontal, central axis X—X so that it does not tend to tilt forwardly or rearwardly during its vertical, reciprocating, sliding movement on the bearings 62. As best seen in FIGS. 9 and 10, the ram 22 is formed with a substantially rectangular cross section, elongate guideway 74 opening into its rear face only, extending horizontally thereacross parallel to the axis X—X and which receives an eccentric assembly 76 for horizontal reciprocating movement as indicated by the arrows A, in FIG. 3, at right angles to the axis of rotation Y—Y of the shaft of the motor 26, which axis is at right angles to the axis X—X. The ram 22 is formed with channels 77 for oil for lubricating the guideway 74 and the bearings 62. The eccentric assembly 76, comprises a central stub shaft 78 which is mounted for rotation about its axis in a roller bearing ring 80 which is best seen in FIG. 5 and which is in turn mounted in a circular cross section bearing block 82 in the form of a roller, which is best seen in FIG. 8. The shaft 78, is arranged to be driven in rotation by reduction gearing (not shown) in the gearbox 24, and is mounted to an output shaft 79 thereof (as best seen in FIGS. 4 and 14), eccentrically with respect to said axis Y—Y which is also the axis of rotation of the output shaft 79.

Figure 4:
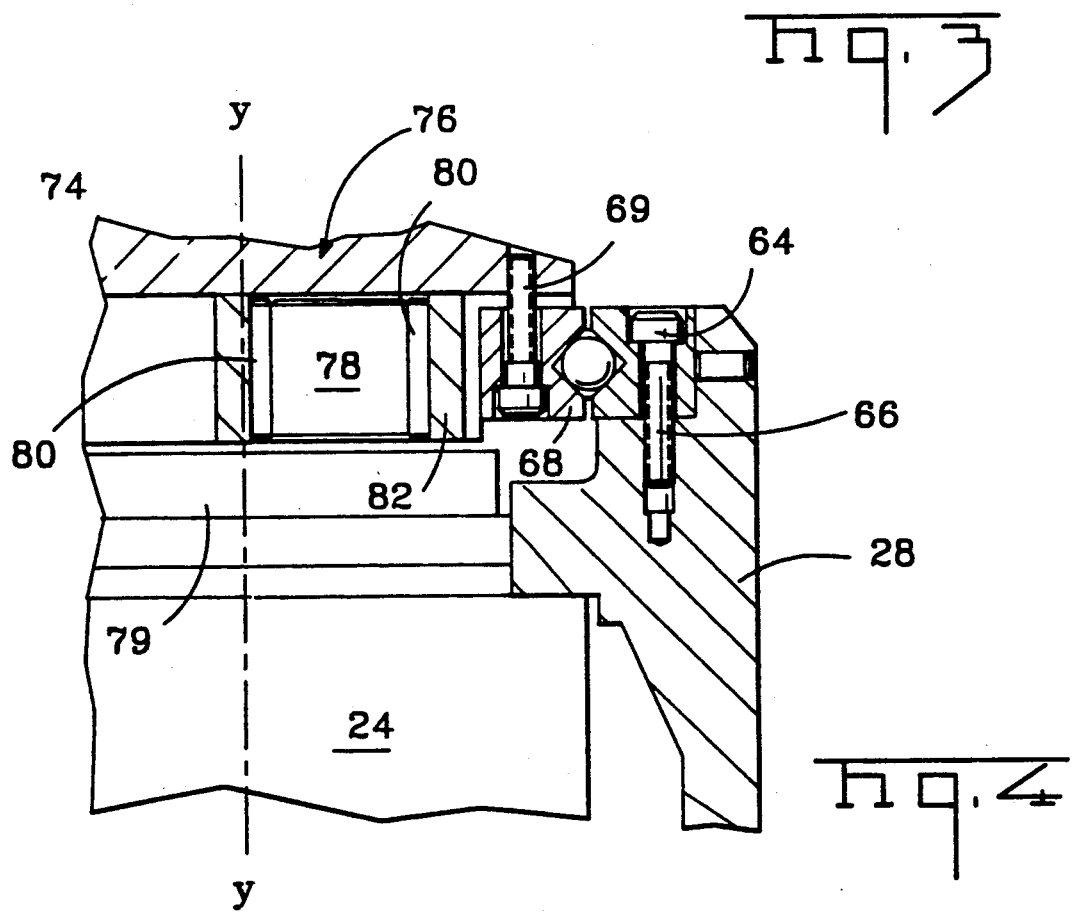
FIG. 4 is an enlarged fragmentary, sectional view of the press, showing the slide ram in an intermediate position.
Figure 5:
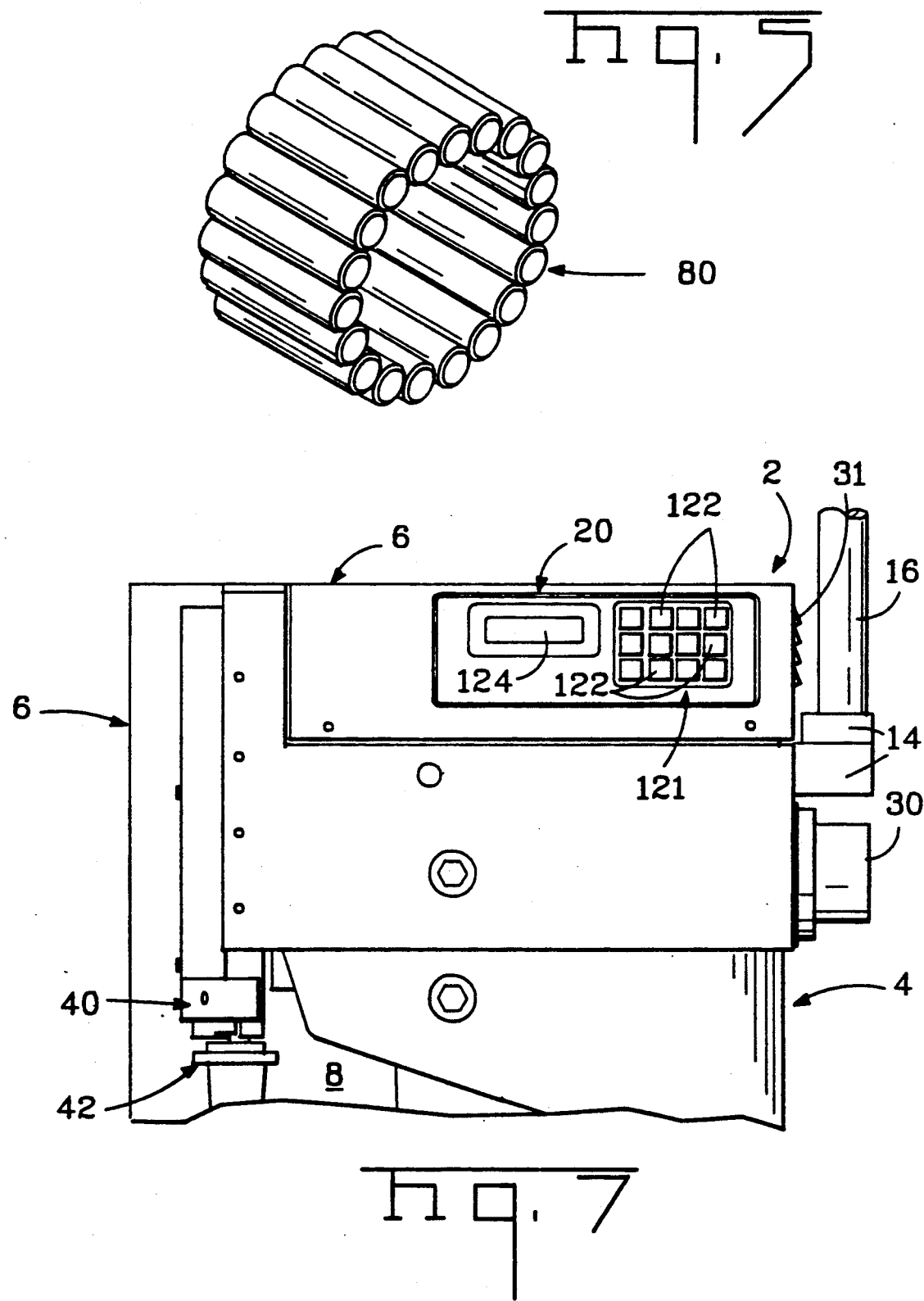
FIG. 5 is an enlarged isometric view of a bearing ring which is shown in FIGS. 2, 3 and 8.

As the shaft 78 is rotated by the motor 25 by way of the reduction gear box 24, assembly 76 drives the ram 22 through its vertical, reciprocating motion, the eccentricity of the assembly 76 being taken up by rolling movement thereof along the guideway 74; as will be apparent from a comparison of FIGS. 2 and 3, in which the ram 22 is in its fully raised, or home, position, with FIG. 4 in which the ram 22 is in an intermediate position. Thus when the applicator 44 is mounted to the press 2, in the manner described above, the crimping die 48 of the applicator 44 is driven by the ram 22 in reciprocating motion to crimp terminals T to leads inserted between the die 48 and the anvil 58. The encoder 30, serves incrementally to measure the angular position of the shaft 78 and thus the vertical position of the ram 22, which is drive through one cycle of its reciprocating movement during each revolution of the shaft 78. The bearing block could be of rectangular, instead of circular, cross-section, arranged to slide, instead of roll, along the guideway 74.

It is important that the press ram 22 should be returned to its home position, that is to say to its fully raised position (0° in FIG. 14), with reasonable precision following each cycle its reciprocating movement because part, for example the feed finger, of an applicator on the plate 32, driven according to the vertical position the applicator ram will be incorrectly synchronized with the end positions of the applicator ram should the latter either overshoot, or undershoot with respect to its home position at the end of a crimping cycle. Also a significant overshoot of the ram 22, could cause the applicator ram to obstruct the insertion of a lead between the crimping die and the crimping anvil of the applicator, at the beginning of a crimping cycle. Proper return of the press ram 22 to its home position at the end of a cycle, is of enhanced importance where the applicator is part of a lead making machine having automatic lead insertion means which must be synchronized with the cycle of the applicator ram. Again, where the applicator is a stripper crimper, stripping means thereof must also be coordinated with the movement of the applicator ram.

A circuit arrangement 89, for controlling the press 2, so that the ram 22 returns, with the required accuracy, to its top dead center, or home, position at the end of each cycle of the press, and for controlling the operation of auxiliary means of an applicator of the press and associated parts of a lead making machine of which the press is part, will now be described with a particular reference to FIGS. 12 to 14.

As shown in FIG. 12, the motor 26 which as mentioned above, is a maintenance free, brushless, three phase, synchronous, DC motor, comprises a permanent magnet 90, which is fixed to shaft 92 of the motor 26 and which is rotated by the field coils (not shown) thereof which are fed with phased DC pulses, PU, PV and PW, respectively, the speed of the motor 26 being a function of the pulse frequency. The magnet 90 cooperates with Hall effect sensors 94 each of which produces a pulse train PX, PY and PZ, respectively, the pulse frequency of which is a function of the speed rotation of the shaft 92, that is to say the motor speed. Three inlets U', V' and W', of the motor 26 are supplied with the pulses PU, PV and PW, respectively by a motor drive pulse generator 96 fed with direct current via a rectifying and smoothing circuit 98 connected via a ganged switch 100 to an alternating current filter 101 which is in turn connected to AC mains voltage by a further ganged switch 102. The motor drive pulse generator 96 is controlled via lines 103 and 105 by a motor control digital logic circuit 104, by way of an interface circuit 106, to vary the frequency of, or reverse the polarity of, the pulses PU, PV and PW or to supply a continuous pulse to a phase of the motor 26 to hold it stationary. The circuit 104 is connected to a main computer 108 by way of a first optoisolator 110, the computer 108 having entered therein a desired motor speed program 112. The computer 108 is also connected to a lead making machine 114 by way of a second optoisolator 116, in which machine the press 2 is incorporated. The computer 108 is supplied from the AC mains by way of a rectifier and voltage changer 118 and is also connected to the control panel 20 by way of an array of lines 120.

Both the sensors 94, and the incremental encoder 30 are connected to the motor control circuit 104 by way of lines 105 and 107, respectively. The circuit 104 comprises a comparator 109 which compares the outputs on the lines 105 and 107 which represent the speed of the motor 26 and the angular position of its shaft 92, respectively, with the desired motor speed registered in the program 112, the speed of the motor 26 being controlled by the circuit 104 by way of the pulse generator 96 upon the basis of such comparison. In theory, the motor 26 could be brought to a halt when the ram 22 is in its top dead center, or home position, only by comparison of the output of the sensors 94 with the program 112, but this could not be achieved with reasonable accuracy in practice by means of a circuit 104 of a kind which can be produced commercially at a reasonable cost. In the present case, however, the speed of the motor 26 as controlled upon the basis of a comparison between the program 12 and the frequency of the pulses PX, PY and PZ, tends to hunt, that is to say it becomes unstable, as the ram 22 is moved towards its home position. At this stage however, the signals supplied by the incremental encoder 30 are effective in the circuit 104 to supply control signals to the pulse generator 96 continually to return the motor 26 to the desired speed stipulated by the program 112. FIG. 13 is a graph in which the ordinate represents the motor speed VL and the abscissa, the angular position AP of the shaft 78. It will be seen from the graph that as the ram 22 descends towards the fully depressed position, that is to say the position at which the applicator ram crimps the terminal to the lead, the speed of the motor 26 rises linearly up to a point proximate to the 180° position of the shaft 78 and falls slightly as the crimping operation is carried out around that position. Thereafter the motor speed rises slightly and then falls again, as the shaft 78 moves towards its home position. As shown in FIG. 13, the encoder 30 serves to linearlise the speed of the motor 26 between approximately the 200° to 300° angular positions the shaft 78. Lines 123 connecting the program 112 to the circuit 104, by way of the optoisolator 110 continually feed into the circuit 104, the desired motor speed criteria for different angular positions of the shaft 78.

The control panel 20 is provided with a bank 121 of touch screens 122, and an indicator screen 124 on which the computer causes to be displayed operating information for example that the press is ready for use or that there is a fault in a particular part of the system.

The motor 26 is controlled throughout its rotation in order to halt the ram 22 when it is at least approximately in its home position, at which time the circuit 104 signals the pulse generator 96 to reverse the polarity of the pulses PU, PV and PW, no specific brake means for the motor 26 being needed. Respective ones of the touch screens 122 may be actuable by the operator to cause the computer 108 to signal the pulse generator 96 by way of the control circuit 104 to the following ends, for example: to start the motor 26; to stop the motor 26 by momentarily reversing the current supply thereto; to hold the motor 26 in its stopped position by applying a continuous current to one of its phases; to reverse the motor 26 to clear a jammed terminal; or to cause the motor 26 to crawl forwardly and rearwardly, by applying its feed pulses at reduced frequency in the appropriate senses, when the press is being set up.

The sense of rotation, of the motor 26 is controlled by way of lines 125 between the computer 108 and the circuit 104, the motor 26 is held in its stopped position by signals applied by the computer 108 to lines 127 between the computer 108 and the circuit 104 and the motor 26 is controlled to crawl by way of lines 129 between the computer 108 and the circuit 104.

A clock pulse line 134 is provided between the computer 108 and the control circuit 104 for the transmission of pulses for synchronizing the computer 108 therewith so that the pulse generator 96 is signalled to control the motor 26, only with a rapidity which is compatible with the following capacity of the motor 26. The motor 26 is provided with a temperature sensor 132, connected via lines 134 to the computer 108 to cause it to actuate the circuit 104 and hence the pulse generator 96, stop the motor 26 when its temperature exceeds a predetermined threshold. The pulse generator 96 also has a temperature sensor 136 connected to the line 134 so that the motor 26 is stopped should the generator 96 become overheated.

When a strip of terminals is being manufactured, by means of a usual progressive strip forming process, the forming process may comprise means for removing from the strip, any terminal which has been found by sensing means of the forming press to be defective. For this reason, the strip of terminals on the reel 18 of the press 2 may have had one or more terminals removed therefrom, so that no terminal may be present on the anvil during a particular cycle of the applicator ram. If the lead making machine presents a lead to the applicator when no terminal is present on its anvil, then that lead will be wasted for this reason, the circuit arrangement 89 is provided with missing terminal sensors 140 and 142 for end strip terminals and side strip terminals respectively, which sensors are connected to the computer 108 by lines 144 and 146 respectively, by way of the optoisolator 110. If a missing terminal is detected upstream of the anvil, the main computer 108 signals the lead presenting means of the lead making machine 114, via lines 148 or 150, as the case may be, and the optoisolator 116, to dwell during one cycle of operation so that no lead is presented to the applicator when there is no terminal on its anvil. The computer 108 also signals the press 2, to carry out an extra cycle during the dwell period of the lead presenting means, by way of lines 152, the optoisolator 110, the circuit 104 and the pulse generator 96, so that the feed finger of the applicator places the next following terminal of the strip on the anvil at the proper time.

The force required to turn the reel 18 of the press 2, varies as a function of the length of the terminal strip T that remains thereon, so that the force with which the feed finger of the applicator must advance the strip will similarly vary, whereby a terminal may be incorrectly positioned on the anvil, as a result of such variation. To avoid this disadvantage, the applicator is provided with an electric motor 154 arranged to rotate a spool 156 to take up a length of interleaving paper 158 with which the turns of a strip of terminals on a reel are customary separated. As the length of paper is taken up, the part of the strip of terminals extending from the reel 18 towards the applicator is caused to sag slightly thereby to relieve the force that the feed finger needs to exert against the strip to advance it towards the anvil of the applicator. Strip sensors 160 and 162 are provided, for sensing the position of said part of the strip of terminals in order to avoid over-winding the paper length by the motor 156.

When the feed finger of the applicator has taken up the terminal strip S to an extent that said part thereof becomes taut said part thereof engages the sensor 160, which actuates a relay 164 to close a switch 166 to connect the motor 154 to the main supply, via lines 168. The motor accordingly starts and rotates the reel 118 by pulling on the paper length 158 until said part of the terminal strip sags to an extent to activate the sensor 162 which actuates the relay 164 to open the switch 166 to stop the motor 156.

When the terminals T are arranged in side or ladder strip form as shown in FIG. 11, the terminals T of the strip S are connected to each other by carrier strip CS, from which the applicator shears a terminal T during each crimping operation. The carrier strips CS from which the terminals are shared are waste, and shear blades 170, driven by an electric motor 172, are provided for shearing the waste strips CS into easily disposable fragments F. If, however, the terminals are in end to end strip form, the applicator only shears out slugs connecting the terminals of the strip, so that the blades 70 are not needed. One of the touch screens 122 is therefore actuable to instruct the computer 108 to bring the motor 172 into operation if, and when, it is needed, by way of the optoisolator 110, and the motor control circuit 104 to which the motor 172 is connected by way of lines 174.

Others of the touch screens 122 are actuable to control parts of, or peripheral equipment of, the lead making machine 114, in light of a particular lead making program, by way of the computer 108, lines 176 and the optoisolator 116, for example to allow for the type of applicator to be used, for example a stripper crimper, or an end feed or a side feed applicator.

At least one set of lines 178 is provided, running from the lead making machine 114, by way of the optoisolator 116, the computer 108, the optoisolator 110, a further optoisolator 180 and the interface circuit 106, to the pulse generator 96 for disabling the pulse generator 96 in the event of a fault, for example a terminal strip fault, or press breakdown.

A key operated shut-down switch 182 is connected to the optoisolator 180 by a line 184, and to the computer 108 via the optoisolator 110, by lines 186, for disabling both the pulse generator 96 and the computer 108 whilst leaving its program 112 intact, however. A guard operated switch 188, connected to the motor control circuit 104 by way of a line 190 is provided for opening the switch 100 to cut-off power to the pulse generator 96, should a guard (not shown) of the press, be opened.

The control circuit 104 is arranged to signal the computer 108 via the optoisolator 116, by way of lines 192 when the eccentric assembly 76 has reached a point P1 (FIG. 14) spaced angularly from the home position, 0°, of the ram 22, for example by 90°, to cause the computer 108, in turn to signal the lead making machine 114, by way of the optoisolator 116 and lines 194 to cause the lead presenting means thereof to withdraw a terminated lead from between the dies and anvil of the applicator, thereby to increase the speed of operation of the lead making machine 114, by the length of a sector S1 of the press cycle, that is to say by as much as a quarter.

We claim:
1. A press comprising:
   a press ram;
   a press frame provided with an elongate ram drive housing having a forward end, a rear end and opposed side walls extending between said ends longi- tudinally of the housing; a pedestal supporting the housing; a base projecting forwardly from the pedestal and into alignment with the press ram; and guide tracks on the forward end of the housing receiving and slideably guiding the press ram for reciprocating motion along a rectilinear path of movement towards and away from said base;

reduction gearing means mounted between the side walls of the housing rearwardly of the ram and having an output shaft, the reduction gearing means being driveable to cause the output shaft thereof to rotate about is own axis;

an eccentric assembly having a drive shaft projecting from the output shaft of the reduction gearing means eccentrically with respect to the axis of rotation of the output shaft and being connected to the ram for driving it towards and away from said base during each revolution of the drive shaft and for concurrent movement of the drive shaft transversely of the path of movement of the ram; and a brushless synchronous electric motor mounted between the side walls of the housing rearwardly of, and adjacent to, the reduction gearing means and in alignment therewith and having an output shaft drivingly connected to the reduction gearing means to drive it, the output shafts of the motor and of the reduction gearing means having a common axis of rotation extending rectilinearly between the side walls of the housing, the motor comprising circuit means for controlling the speed of the motor to stop the ram at least proximate to a home position thereof remote from said base during the reciprocating movement of the ram, in accordance with a motor speed program stored in said circuit means.

2. A press as recited in claim 1, wherein the motor is mounted with substantial clearance between the side walls of the housing, means for ventilating the motor being provided in the side walls.

3. A press as recited in claim 1, wherein the pedestal is formed integrally with the ram drive housing and the base is formed integrally with the pedestal.

4. A press as recited in claim 1, wherein said motor comprises an incremental encoder connected to the output shaft of the motor for producing a first output representing the angular position to the drive shaft of the eccentric assembly, and HALL effect sensors for producing a continuous second output representing the speed of the motor, said circuit means having means for comparing said first and second outputs with said program, for controlling the speed of the motor.

5. A press for operating an electrical terminal applicator, the press comprising;

a press ram;

a press frame provided with an elongate ram drive housing a forward end, a rear end and opposed side walls extending between said ends longitudinally of the housing; a pedestal supporting the housing; a base projecting forwardly from the pedestal and having means aligned with a press ram, for supporting an electrical applicator; and guide tracks on said forward end of the housing receiving and slideably guiding the ram for reciprocating motion along a rectilinear path of movement towards and away from an applicator supporting means;

reduction gearing means mounted between the side walls of the housing rearwardly of the ram and having an output shaft, the reduction gearing means being driveable to cause the output shaft thereof rotate about is own axis;

an eccentric assembly having drive shaft projecting from the output shaft of the reduction gearing means eccentrically with respect to the axis of rotation of said output shaft and being connected to the ram for driving it towards and away from the applicator support during a revolution of said output shaft and for concurrent movement of the drive shaft transversely of the path of movement of the ram;

a synchronous DC electric motor mounted between the side walls of the housing rearwardly of, and adjacent to, the reduction gearing means and having an output shaft drivingly connected to the reduction gearing means to drive its encoding means connected to the output shaft of the motor for producing a first output representing the angular position of the drive shaft of the eccentric assembly, and measuring means for producing a second output representing the speed of the output shaft of the motor; and electronic circuit means connected to said encoding means, said measuring means, and to said motor, for controlling the speed thereof according to a desired motor speed program stored in said circuit means.

6. A press as recited in claim 5, wherein the motor is mounted in alignment with the reduction gearing means, the output shafts of the motor and of the reduction gearing means having a common axis of rotation extending midway between the side walls of the housing, the encoding means being constituted by an incremental encoder attached to the motor and projecting rearwardly from the housing.

7. Motor as recited in claim 6, wherein said motor is a phased pulse-fed brushless motor, the press comprising a control panel incorporated in one of the side walls of the housing and having switch means actuable to cause said circuit means to apply to a single continuous pulse to a phase of the drive motor to hold it in a stop position, and switch means actuable to cause said circuit means to apply feed pulses to the motor at a reduced frequency and with such polarity as to cause the motor to crawl forwardly and rearwardly at reduced speed.

8. A press comprising;

a press ram;

a press frame supporting the ram for reciprocating movement through a working and a return stroke;

a direct current phased pulse-fed, synchronous electric motor on the press frame, the motor having an output shaft for driving the ram through said working and return strokes;

reduction gearing means connecting the output shaft of the motor to the ram, whereby the ram is driven through a working stroke and a consecutive return stroke during a predetermined number of revolutions of the output shaft of the motor;

incremental encoding means on the output shaft of the motor for producing a first electrical output representing the position of the ram along the path of movement thereof;

measuring means on the motor for producing a continuous second electrical output representing the speed of the motor; and electronic circuit means for storing a desired motor speed program and being connected to the encoding means, to the measuring means, and to the motor, for comparing said first and second outputs with said program and for producing a third output for stopping the motor substantially upon the completion of each return stroke of the ram.

9. A press as recited in claim 8, wherein the press frame is provided with an elongate drive housing having a forward end, a rear end and opposed side walls extending between said ends, the motor and the reduction gearing means being mounted between the side walls of the housing in alignment with one another and the motor being disposed rearwardly of the reduction gearing means, a pedestal supporting the housing having a base projecting forwardly from the pedestal for supporting an electrical terminal applicator in alignment with the ram, a forward end of the housing being provided with a guide track slideably guiding the ram for reciprocating movement towards and away from the applicator supporting means, the reduction gearing means having an output shaft eccentrically connected to the ram and the output shaft of the motor and the reduction gearing means having a common axis of rotation extending rectilinearly midway between the side walls of the housing.

10. A press as recited in claim 8, wherein said electronic circuit means comprises a motor control circuit for reversing the feed current supplied to the motor to stop it substantially upon the completion of each return stroke of the press ram.

11. A motor as recited in claim 8, wherein the press has incorporated thereinto, a control panel having switch means connected to the electronic circuit means and being actuable to cause the electronic circuit means to apply a single continuous pulse to a phase of the motor to hold it in a stopped position.

12. A press as recited in claim 8, incorporating a control panel connected to said circuit means and having switch means actuable to cause it to supply feed pulses to the motor at reduced frequency and of a polarity to cause the motor to crawl forwardly and rearwardly at reduced speed.

* * * * *